United States Patent [19]

Koya et al.

[11] Patent Number: 4,477,913
[45] Date of Patent: Oct. 16, 1984

[54] AUTOMATIC EQUALIZER APPARATUS

[75] Inventors: Masahiro Koya, Los Angeles, Calif.; Narimichi Maeda, Tachikawa, Japan; Kohei Ishizuka, Hachioji, Japan; Kazuhiko Takaoka, Tokyo, Japan; Yoshiro Kokuryo, Kodaira, Japan; Yasuhiro Kita, Hachioji, Japan

[73] Assignees: Hitachi, Ltd.; Hitachi Denshi Kabushiki Kaisha, both of Tokyo, Japan

[21] Appl. No.: 368,664

[22] Filed: Apr. 15, 1982

[30] Foreign Application Priority Data

Apr. 17, 1981 [JP] Japan .................. 56-57141

[51] Int. Cl.³ ............................... H04B 3/14
[52] U.S. Cl. ....................... 375/13; 333/18; 333/28 R
[58] Field of Search ............... 375/11, 12, 13, 14; 333/18, 28 R, 166; 364/724

[56] References Cited

U.S. PATENT DOCUMENTS 3,781,722  12/1973  Pierson ..................... 333/28 R
4,320,517   3/1982  Godard et al. ............... 375/113
4,336,613   6/1982  Hewes ....................... 333/18

FOREIGN PATENT DOCUMENTS 54-59810  5/1979  Japan ........................ 375/15

Primary Examiner—Robert L. Griffin
Assistant Examiner—Stephen Chin
Attorney, Agent, or Firm—Antonelli, Terry & Wands

[57] ABSTRACT

An equalizer apparatus suitable for use in a MODEM for receiving a signal having passed through a number of carrier-band lines is disclosed in which the number of carrier-band lines is detected from a training signal, and electrical connection of a fixed equalizer to a variable equalizer is controlled on the basis of the number of carrier-band lines, in order to form a precise, simple automatic equalizer apparatus.

7 Claims, 8 Drawing Figures

AUTOMATIC EQUALIZER APPARATUS

BACKGROUND OF THE INVENTION

The present invention relates to an automatic equalizer apparatus, and more particularly to an automatic equalizer apparatus used in performing data transmission through telephone lines, for causing a modulator and demodulator (that is, a MODEM) to perform automatic phase equalization well adapted to frequency characteristics of carrier-band lines, through which a transmission signal has passed.

When a data signal is transmitted through telephone lines, the receiving equipment is required to have an equalizer to compensate for variations in a transmission characteristic between data terminal equipment. Especially, in data transmission, it is impossible to carry out high-quality data communication unless a group delay distortion at (that is, a phase characteristic of) a transmission line is equalized accurately. Accordingly, a MODEM in the receiving equipment is usually provided with an automatic equalizer.

However, a conventional automatic equalizer is limited in equalizing ability, and can operate satisfactorily only in the case where the number of carrier-band lines (in another word, the number of links) is smaller than three or four. When the number of carrier-band lines is large, it arouses a problem in the structure of the automatic equalizer to perform phase equalization only by the conventional automatic equalizer. In more detail, although various phase equalizers have been known, in order to reduce the size and digitize these phase equalizers, it is desirable to form the so-called transversal filter, in which input and output signals of a number of delay elements are multiplied by predetermined coefficients and the signals thus multiplied are added to each other, of a digital signal processor. However, in the case where equalization has to be made in a wide range, the number of multiplications is large, and it is impossible to process such multiplications with a digital signal processor.

In order to solve this problem, a method has been used in which there is prepared a fixed equalizer capable of compensating for variations in transmission characteristic when the number of links is smaller than about three, the number of links is checked at the starting time of data transmission, and the fixed equalizer is manually inserted into a MODEM when it is judged that the number of links is greater than or equal to a predetermined number (for example, four).

In the above-mentioned method, however, the number of links is detected in a complicated manner. Further, the fixed equalizer has to be manually inserted in the MODEM when necessary. Accordingly, in the case where exchange of data transmission is frequently performed, this method is very disadvantageous to the effective use of data transmission line since it takes much time to detect the number of the links and to adapt the equalizer to the characteristic of the links.

Further, another method has been proposed in which the number of links is detected and an optimum equalizer is formed in accordance with the number of links. However, a special signal for detecting the number of links is required in this method. Further, as mentioned previously, it is impossible to form the optimum equalizer of a digital signal processor.

SUMMARY OF THE INVENTION

It is accordingly a main object of the present invention is to provide an automatic equalizer apparatus which can perform optimum phase equalization even when the number of carrier-band lines (that is, the number of links) is greatly varied.

More specifically, it is a further object of the present invention to provide an automatic equalizer apparatus which can efficiently detect the number of links among carrier-band lines for transmitting a data signal, by utilizing a training signal used in conventional data transmission, and which can reduce the amount of operational processing performed by an automatic equalizer included in a MODEM, that is, can make small a range of transmission characteristic covered by the automatic equalizer.

In order to attain the above objects, an automatic equalizer apparatus according to the present invention comprises a circuit for detecting automatically the number of links from a usually-used training signal, a fixed equalizer for performing phase equalization for a change in transmission characteristic corresponding to a fixed number of links, and a control circuit for controlling the connection of the fixed equalizer to the receiving part of a MODEM on the basis of the output of the detecting circuit.

In particular, the number of links is detected in the following manner. That is, a frequency component is detected from a received signal in such a manner that a sum frequency of carrier and modulating frequencies of a training signal and a difference frequency between the carrier and modulating frequencies lie in frequency ranges where a frequency-attenuation characteristic of a transmission line varies in accordance with the number of links included in the transmission line, and the level of the detected frequency component is compared with a level of the frequency component obtained when the number of links is a predetermined number.

In an automatic equalizer apparatus according to the present invention, when equalization has to be made for a large variation in transmission characteristic, a great portion of the large variation can be compensated by a fixed equalizer, and the remaining portion is compensated by a variable equalizer connected to the fixed equalizer. Accordingly, a transversal equalizer in the variable equalizer can be readily formed of a digital signal processor having a relatively low speed. That is, the number of taps in the transversal equalizer is small. Further, a conventional training signal satisfies the above-mentioned frequenct relation, as will be explained later. Accordingly, it is not required to form a special training signal for carrying out the present invention. Further, the connection of a fixed equalizer to a MODEM is automatically controlled, and therefore the present invention is advantageous especially in the case where data transmission is frequently carried out.

The above-mentioned and other features and objects of the present invention will become more apparent by reference to the following description taken in conjunction with the accompanying drawings.

DESCRIPTION OF THE PREFERRED EMBODIMENT

Figure 1:
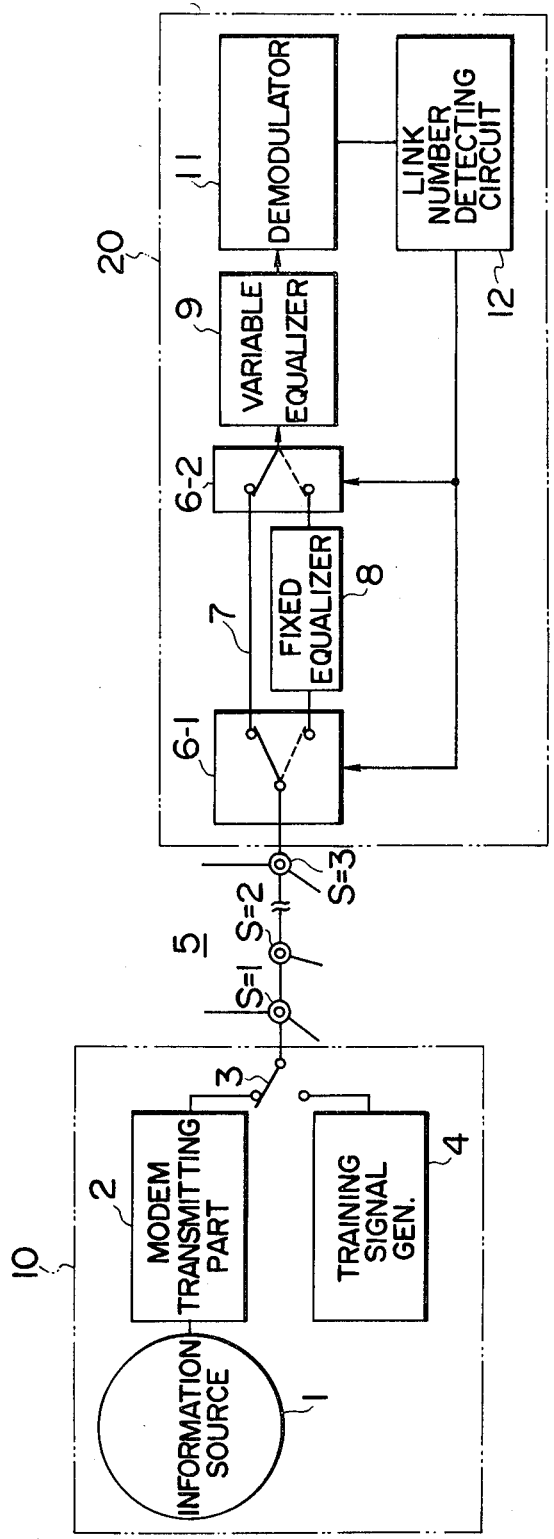
FIG. 1 is a block diagram showing the construction of a data transmission system, to which an automatic equalizer apparatus according to the present invention is applied.

FIG. 1 shows the construction of a data transmission system which utilizes telephone lines and includes an equalizer apparatus according to the present invention. In FIG. 1, a block 10 bounded by a broken line designates a subscriber's data transmitting terminal equipment, and a block 20 a subscriber's data receiving terminal equipment. In fact, each subscriber's terminal is provided with both of the transmitting terminal equipment and the receiving terminal equipment. In FIG. 1, however, only the transmitting equipment is shown at the terminal on the left side and only the receiving equipment is shown at the terminal on the right side, for convenience of illustration. In the transmitting terminal equipment 10, data from a data source (namely, an information source) 1 is converted by a transmitting part 2 of MODEM into a signal suited to be transmitted (for example, an amplitude and phase modulated signal), and is then sent to a transmission line 5 through a switch 3. In such a data transmission system, prior to transmission of data, a training signal is sent out to adjust the receiving terminal equipment, for example, an automatic gain control circuit (an AGC circuit), a carrier signal detecting circuit, a timing control circuit, an automatic equalizer and others. A block 4 indicates a training signal generating circuit, and a training signal is sent from the circuit 4 to the transmission line 5 at the starting time of data transmission. In the case where the transmission line 5 is formed in accordance with a frequency division carrier frequency communication system, a signal in a voice frequency band of 0.3 to 3.4 KHz passes through terminal equipments such as a channel translating equipment, a group translating equipment, a super group translating equipment, and a repeater, while being subjected to a group delay distortion (namely, a phase distortion) at each of the terminal equipments and the repeater, and is then applied to the receiving terminal equipment 20. In the equipment 20, when data transmission is started, the training signal is applied to a receiving part 11 (including a variable equalizer 9) of MODEM through a line 7 selected by switches 6-1 and 6-2. The above-mentioned receiving equipments are adjusted in the period of the training signal in the same manner as in conventional receiving equipments. Further, according to the present invention, the number of carrier-band lines (namely, the number of links) in the transmission line 5 is detected from the training signal by a link number detecting circuit 12. When it is judged that the number of links is larger than or equal to a predetermined number (for example, three of four), the switches 6-1 and 6-2 are set to the side of a fixed equalizer 8. When it is judged that the number of links is smaller than the predetermined number, the switches are set to the side of the line 7.

Figure 2:
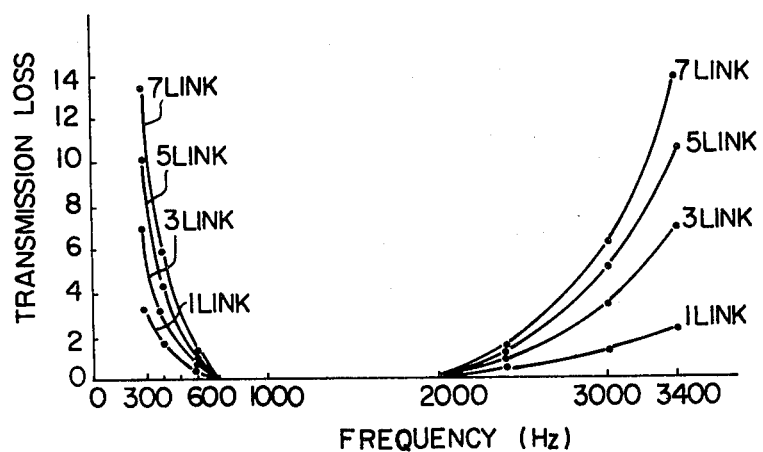
FIG. 2 is a graph showing changes in frequency vs. transmission loss characteristic produced when the number of links is varied.

It is known that a group delay distortion at a transmission line is approximately proportional to the number of carrier-band lines (or links) existing between the transmitting terminal equipment 10 and the receiving terminal equipment 20. Further, it is also known that frequency characteristics of received signal depend upon the number of links as shown in FIG. 2 in the voice frequency band, that is, the amount of attenuation due to transmission line corresponds to the number of links in both of a low frequency range from 300 to 600 Hz and a high frequency range from 2,000 to 3,400 Hz.

The link number detecting circuit 12 detects the number of links in the transmission line from an ordinarily-used training signal, on the basis of the above-mentioned characteristic of transmission line.

Now, explanation will be made on an embodiment of the present invention in the case where a data signal having a bit rate of 9,600 bits/sec is used to modulate a carrier wave in amplitude and phase by a transmitting part of a MODEM, and a signal thus modulated in used to detect the number of carrier-band lines.

In data transmission using a voice frequency band (from 0.3 to 3.4 KHz) at telephone lines, a carrier signal is modulated in amplitude and phase with a data signal at a transmitting part of a MODEL, and an analog signal thus obtained is transmitted. In other words, carrier waves having an orthogonal relation to each other are amplitude-modulated independently, and carrier waves thus modulated are combined with each other to form an analog signal to be transmitted.

Figure 4:
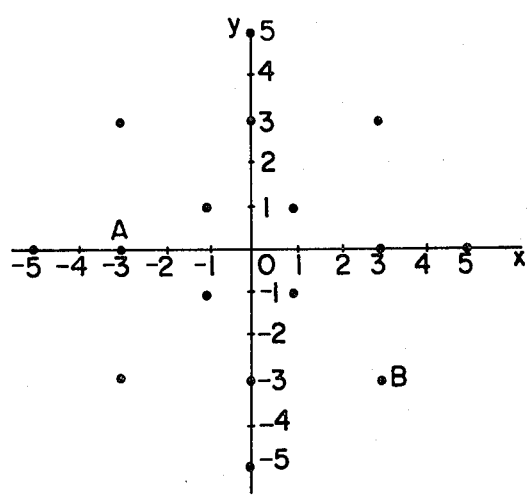
FIG. 4 is a graph showing information which is transmitted by the amplitude-phase modulation.
Figure 3:
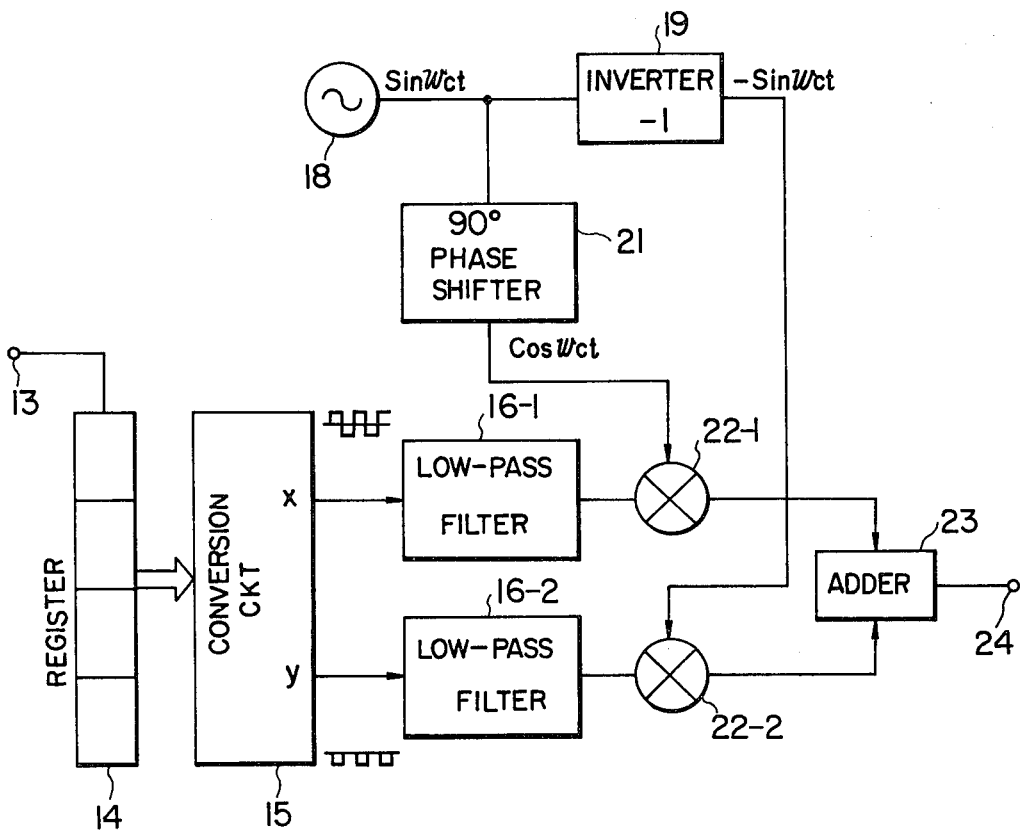
FIG. 3 is a block diagram for showing an example of an amplitude modulation circuit.
Figure 5:
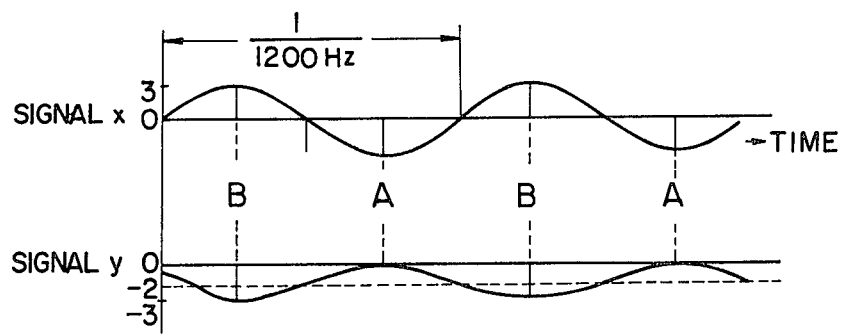
FIG. 5 is a waveform chart for showing a modulating signal used as a training signal.

FIG. 3 shows a modulator in the transmitting part of the MODEM. The modulator shown in FIG. 3 has the same structure as a conventional modulator. Referring to FIG. 3, a data signal having a bit rate of 9,600 bits/sec is applied to a register 14 through an input terminal 13, and four consecutive bits of the data signal are supplied to a conversion circuit 15. The conversion circuit 15 assigns the first one of four bits and the remaining bits to amplitude and phase, respectively. That is, amplitude and phase can take two ($=2'$) kinds of amplitude and eight ($=2^3$) kinds of phase, respectively. Thus, sixteen kinds of information are obtained, as indicated by black dots in an x-y plane of FIG. 4. In other words, a 4-bit part of the data signal is converted into one of the sixteen kinds of information, that is, is indicated by, for example, a point A ($x=-3$, $y=0$) or a point B ($x=3$, $y=-3$) in FIG. 4. Each of the sixteen kinds of information has a fundamental frequency $f_a$ of 1200 Hz ($=9600$ Hz $\div 4 \div 2$). An x-signal and a y-signal, each of which is a square wave signal having the above-mentioned frequency $f_a$, are applied to low-pass filters 16-1 and 16-2, respectively, to remove a high frequency component from each of the x-signal and y-signal. FIG. 5 shows output waveforms from the low-pass filters 16-1 and 16-2 for a training signal which repeatedly occupies the points A and B at a frequency of 1200 Hz. The waveforms shown in FIG. 5 is used to modulate a carrier signal. In more detail, a part of a carrier signal from a sine wave generator 18 (which generates the carrier signal having a waveform of $\sin \omega_c t$) is applied through a 90° phase shifter 21 to a multiplier 22-1 to be multiplied therein by the output of the low-pass filter 16-1, and another part of the carrier signal from the generator 18 is applied through an inverter 19 to a multiplier 22-2 to be multiplied therein by the output of the low-pass filter 16-2. Respective outputs of the multipliers 22-1 and 22-2 are added to each other by an adder 23, as expressed by the following equation:

$$x \cos \omega_c t - y \sin \omega_c t = \sqrt{x^2+y^2} \sin(\omega_c t + \phi) \quad (1)$$

Thus, an analog signal which is modulated in amplitude and phase as indicated by Equation (1), is sent from an output terminal 24 to a receiving terminal equipment through a transmission line including carrier-band lines.

When an information signal is the training signal occupying the points A and B repeatedly, the x-signal and the y-signal have, on the output sides of the low-pass filters 16-1 and 16-2, such waveforms as shown in FIG. 5. That is, the x- and y-signals outputted from the low-pass filters are expressed by the following equations:

$$x = 3\cos 2\pi f_a t, \quad y = -\frac{3}{2} - \frac{3}{2}\cos 2\pi f_a t \quad (2)$$

By substituting the equations (2) into the equation (1), the amplitude and phase modulated signal z is expressed by the following equation:

$$z = 3\cos 2\pi f_a t \cdot \cos 2\pi f_c t - \left(-\frac{3}{2} - \frac{3}{2}\cos 2\pi f_a t\right) \sin 2\pi f_c t$$

By rearranging the above equation, the signal z is expressed as follows:

$$z = \frac{3}{2} \sin 2\pi f_c t + \frac{3\sqrt{5}}{4} \{\sin(2\pi f_c t + \theta + 2\pi f_a t) +$$

$$\sin(2\pi f_c t + \theta - 2\pi f_a t)\}.$$

When the frequencies $f_a$ and $f_c$ are equal to 1200 Hz and 1700 Hz, respectively, a frequency component having a sum frequency $f_a + f_c$ of 2900 ($=1700+1200$) Hz and another frequency component having a difference frequency $f_c - f_a$ of 500 ($=1700-1200$) Hz are contained in the signal z. When the above frequency components having frequencies of 500 Hz ($=f_c - f_a$) and 2900 Hz ($=f_c + f_a$) pass through a plurality of carrier-band lines (that is, a plurality of links), these frequency components are attenuated in proportion to the number of links, as shown in FIG. 2.

Figure 6:
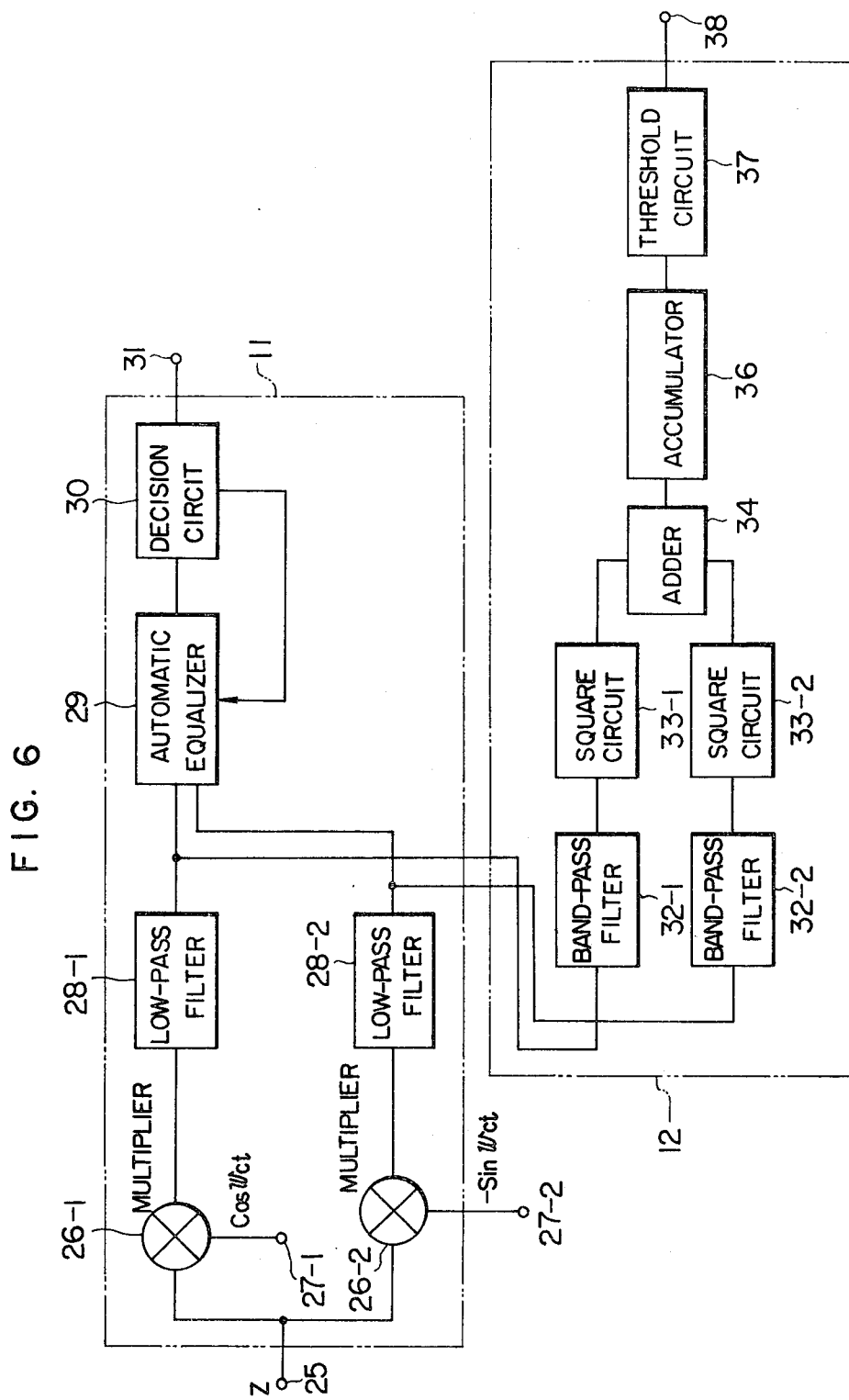
FIGS. 6 and 7 are block diagrams for showing examples of a link number detecting circuit included in an automatic equalizer apparatus according to the present invention.

FIG. 6 shows a demodulating part according to the present invention. In FIG. 6, a block 11 bounded by a broken line designates a demodulator, and a block 12 a link number detecting circuit. The demodulator 11 is the same as a well-known conventional demodulator. Referring to FIG. 6, the input signal z applied to an input terminal 25 is supplied to multipliers 26-1 and 26-2 to be multiplied therein by signals $\cos\omega_c t$ and $-\sin\omega_c t$ supplied respectively from terminals 27-1 and 27-2. Accordingly, respective outputs of the multipliers 26-1 and 26-2 are given by the following equations:

$$\left.\begin{aligned} z \cdot \cos\omega_c t &= (x\cos\omega_c t - y\sin\omega_c t)\cos\omega_c t \\ &= \frac{x}{2} + \frac{x}{2}\cos 2\omega_c t - \frac{y}{2}\sin 2\omega_c t \\ z \cdot (-\sin\omega_c t) &= (x\cos\omega_c t - y\sin\omega_c t)(-\sin\omega_c t) \\ &= \frac{y}{2} - \frac{y}{2}\cos 2\omega_c t - \frac{x}{2}\sin 2\omega_c t \end{aligned}\right\} \quad (3)$$

The output signals $z \cos \omega_c t$ and $-z \sin \omega_c t$ are applied to low-pass filters 28-1 and 28-2, respectively, in order to remove from these signals frequency components having an angular frequency of $2\omega_c$. Thus, signals $$\frac{x}{2}\left(=\frac{3}{2}\cos 2\pi f_a t\right) \text{ and } \frac{y}{2}\left(=-\frac{3}{4}-\frac{3}{4}\cos 2\pi f_a t\right)$$

are outputted from the low-pass filters 28-1 and 28-2, respectively. These signals are wave shaped in an automatic equalizer 29, and then applied to a decision circuit 30. In the decision circuit 30, it is judged which of the black dots in FIG. 4 is indicated by the input signal z, and the signal z is converted into a data signal. The data signal thus obtained is sent from an output terminal 31 to a signal processing circuit (not shown). When the above-mentioned operations are normally performed, the variable equalizer 29 is controlled on the basis of information from the decision circuit 30.

Next, the structure and operation of the link number detecting circuit 12 will be explained. Referring to FIG. 6 the signals x/2 and y/2 outputted from the low-pass filters 28-1 and 28-2 are applied to band-pass filters 32-1 and 32-2 each for extracting a frequency component having the frequency $f_a$, respectively, and then supplied through square circuits 33-1 and 33-2 to an adder 34 to be added to each other. Accordingly, in the case where the training signal expressed by the equations (2) is transmitted, if the training signal is not subjected to attenuation dependent on the number of links, respective outputs $x'$ and $y'$ of the band-pass filters 32-1 and 32-2 are given by the following equations:

$$x' = \frac{3}{2}\cos 2\pi f_a t, \quad y' = -\frac{3}{4}\cos 2\pi f_a t$$

Accordingly, the output $(x')^2 + (y')^2$ of the adder 34 is given by the following equation:

$$(x')^2 + (y')^2 = \frac{9}{4}\cos^2 2\pi f_a t + \frac{9}{16}\cos^2 2\pi f_a t =$$

$$\left(\frac{9}{4} + \frac{9}{16}\right) \times \frac{1}{2} + \left(\frac{9}{4} + \frac{9}{16}\right) \cdot \frac{1}{2}\cos 4\pi f_a t$$

The output signal of the adder 34 is added up by an accumulator 36 for a predetermined time. Thus, the first termn on the right-hand side of the above equation becomes a DC component proportional to (9/4+9/16), and the second term indicating a high frequency component becomes zero since positive and negative components cancel each other.

When the modulated signal z passes through a number of carrier-band lines, the sum frequency component having a frequency of 2900 Hz ($=f_c+f_a$) and the difference frequency component having a frequency of 500 Hz ($=f_c-f_a$) are attenuated. These components thus attenuated are converted by the demodulator into a signal having the frequency $f_a$ ($=1200$ Hz). At this time, a carrier component having the frequency $f_c$ ($=1700$ Hz) is converted into a DC component, which is removed by the band-pass filters 32-1 and 32-2.

Now let us consider the case where the sum frequency component having a frequency of 2900 Hz ($=f_a+f_c$) and the difference frequency component having a frequency of 500 Hz ($=f_a-f_c$) are subjected to substantially the same attenuation (which is expressed by a factor a) when pass through a transmission line including three carrier-band lines, and other losses can be neglected. In this case, the output x' of the band-pass filter 32-1 and the output y' of the band-pass filter 32-2 are obtained in the same manner as mentioned above, and are expressed by the following equations:

$$x' = \frac{3}{2} a \cos 2\pi f_a t, \quad y' = -\frac{3}{4} a \cos 2\pi f_a t.$$

Accordingly, the adder 34 delivers an output proportional to $(9/4 + 9/16) a^2$.

The output of the accumulator 36 is applied to a threshold circuit 37. A value which is a little larger than $(9/4+9/16) a^2$, is set as a threshold level Vth in the threshold circuit 37. When an input signal to the circuit 37 has a level lower than the threshold level Vth, the threshold circuit generates a signal for setting each of the switches 6-1 and 6-2 (shown in FIG. 1) to the lower side, that is, a signal for controlling the switches 6-1 and 6-2 so that the fixed equalizer 8 which performs phase equalization when the number of links is equal to three, is connected between the transmission line and the demodulator. When the input signal has a level higher than the threshold level Vth, the threshold circuit 37 generates a signal for setting each of the switches 6-1 and 6-2 to the upper side, that is, a control signal for connecting the transmission line to the demodulator without including the fixed equalizer 8 therebetween. Thus, the number of links is readily detected on the basis of the training signal, and the fixed equalizer can be automatically connected between or separated from the transmission line and the demodulator without requiring any manual operation.

Further, in the case where a training period is not given, it is impossible to judge the characteristic of the transmission line, and the fixed equalizer is not inserted between the transmission line and the demodulator. In this case, phase equalization may be performed only by the variable equalizer.

Figure 7:
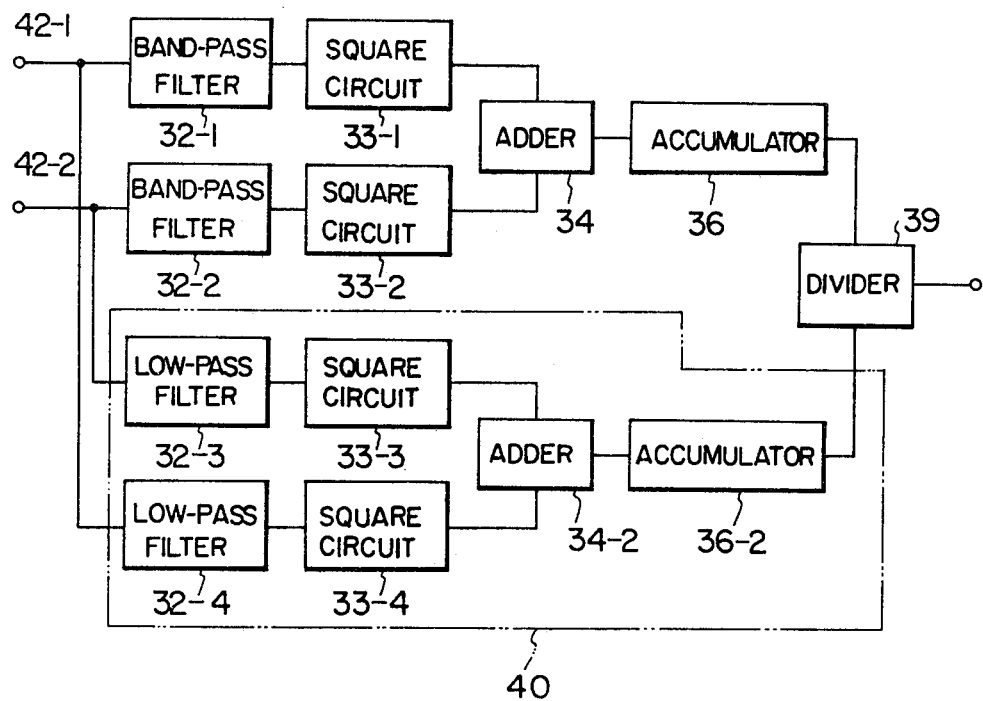

FIG. 7 shows another example of the link number detecting circuit. The circuit arrangement shown in FIG. 7 is a little complicated as compared with the circuit 12 shown in FIG. 6, but can estimate the number of links with satisfactory accuracy. In FIGS. 6 and 7, blocks given the same reference numeral have the same structure and function. The circuit shown in FIG. 7 includes a DC-component detecting circuit 40 in addition to the link number detecting circuit 12 shown in FIG. 6. Referring to FIG. 7, input terminals 42-1 and 42-2 are connected to the low-pass filters 28-1 and 28-2 shown in FIG. 6, respectively. Low-pass filters 32-3 and 32-4 are circuits each for detecting a DC component when a training signal is received, and can remove an $f_a$-component. Further, in FIG. 7, reference numerals 33-3 and 33-4 designate square circuits, 34-2 an adder,
36-2 an accumulator, and 39 a divider. The divider 39 is used to divide the output of the link number detecting circuit by the output of the DC-component detecting circuit 40.

Figure 8:
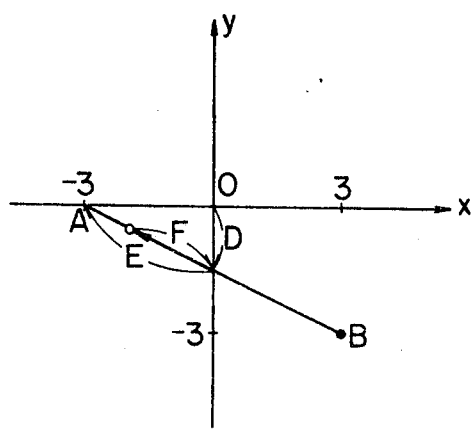
FIG. 8 is a graph for explaining the operation of the link number detecting circuit shown in FIG. 7.

FIG. 8 is a graph for explaining the operation of the circuit shown in FIG. 7 in the case where the training signal repeatedly occupies the points A and B shown in FIG. 4. When the transmission line includes no link, the input power supplied to the receiving terminal is expressed by (D+E), as shown in FIG. 8. When a link exists in the transmission line, the input power is expressed by (D+F). Accordingly, a ratio of a gain of the AGC circuit at the time when the transmission line includes no link, to a gain of the AGC circuit at the time when the transmission line includes a link, is equal to $$\frac{1}{D+E} : \frac{1}{D+F}$$

(since the AGC circuit operates to keep a signal level constant). According to the link number detecting circuit shown in FIG. 6, a ratio of an output power of the link number detecting circuit obtained when the number of links is equal to zero, to an output power of the above circuit obtained when the number of links is not equal to zero, is expressed by $$\frac{D}{D+E} : \frac{F}{D+F} = \frac{E}{F} \cdot \frac{D+F}{D+E}.$$

On the other hand, according to the circuit shown in FIG. 7, a ratio of an output power of the DC-component detecting circuit 40 obtained when the number of links is zero, to an output power of the circuit 40 obtained when the number of links is not equal to zero, is given by $$\frac{D}{D+E} : \frac{D}{D+F} = \frac{D+F}{D+E}.$$

Further, a ratio of an output power of the link number detecting circuit (shown in the upper part of FIG. 7) obtained when the number of links is equal to zero, to an output power of the above circuit obtained when the number of links is not equal to zero, is expressed by $$\frac{E}{D+E} : \frac{F}{D+F} = \frac{E}{F} \cdot \frac{D+F}{D+E}.$$

According to the circuit arrangement shown in FIG. 7, the above-mentioned ratio with respect to the output power of the link number detecting circuit is corrected by the output power of the DC-component detecting circuit 40, and the corrected ratio is given by $$\left(\frac{E}{D+E} \Big/ \frac{D}{D+E}\right) : \left(\frac{F}{D+F} \Big/ \frac{D}{D+F}\right) = \frac{E}{D} : \frac{F}{D} = \frac{E}{F}.$$

As is apparent from the above, when the circuit arrangement shown in FIG. 7 is used, a ratio of a received electric power of the modulating frequency component (having a frequency of 1200 Hz) in the case where the number of links is equal to zero, to that in the case where the number of links is not equal to zero, takes a larger value, as compared with a ratio obtained when the circuit shown in FIG. 6 is used. Therefore, the number of carrier-band lines can be estimated with high accuracy by using the circuit arrangement shown in FIG. 7.

We claim:

1. An automatic equalizer apparatus comprising:
   a circuit for detecting from a received signal the number of the carrier-band lines in a transmission line, said received signal having passed through said transmission line;
   a fixed equalizer; and
   a control circuit for controlling an operation as to whether said fixed equalizer is connected in front of a receiving MODEM or not, on the basis of an output signal from said circuit for detecting the number of carrier-band lines.

2. An automatic equalizer apparatus according to claim 1, wherein said circuit for detecting the number of carrier-band lines detects the number of carrier-band lines from a training signal received by said receiving MODEM.

3. An automatic equalizer apparatus according to claim 2, wherein said training signal is formed in such a manner that a sum frequency of and a difference frequency between a modulating frequency of the training signal and a carrier frequency lie in a frequency range where a frequency characteristic of said transmission line varies with said number of carrier-band lines.

4. An automatic equalizer apparatus according to claim 3, wherein said sum frequency lies in a range from 2 to 3.4 KHz and said difference frequency lies in a range from 300 to 600 Hz.

5. An automatic equalizer apparatus according to claim 1, 2, 3, or 4, wherein said circuit for detecting the number of carrier-band lines includes a first low-pass filter for extracting a low-frequency component from a first signal obtained by multiplying an amplitude and phase modulated, received signal by $\cos\omega_c t$ (where $\omega_c$ indicates a frequency of a carrier wave of said received signal and t indicates a time), a second low-pass filter for extracting a low-frequency component from a second signal obtained by multiplying said received signal Z by $-\sin\omega_c t$, first and second band-pass filters connected respectively to said first and second low-pass filters, first and second square circuits connected respectively to said first and second band-pass filters, an adder for adding respective outputs of said first and second square circuits, an accumulator for adding up the output of said adder for a predetermined time, and a threshold circuit for comparing the output of said accumulator with a threshold level.

6. The automatic equalizer apparatus according to claim 1, 2, 3 or 4, wherein said receiving modem includes a variable equalizer, and wherein said control circuit includes means for controlling the connection of said variable equalizer to an input terminal of said receiving modem either thorugh said fixed equalizer or not, on the basis of said output signal from said circuit for detecting the number of carrier-band lines.

7. The automatic equalizer apparatus according to claim 5, wherein said receiving modem includes a variable equalizer, and wherein said control circuit includes means for controlling the connection of said variable equalizer to an input terminal of said receiving modem either through said fixed equalizer or not, on the basis of said output signal from said circuit for detecting the number of carrier-band lines.

* * * * *